T. J. McINTOSH.
REVERSIBLE FORK AND RAKE.
APPLICATION FILED NOV. 23, 1912.
1,076,048.
Patented Oct. 21, 1913.
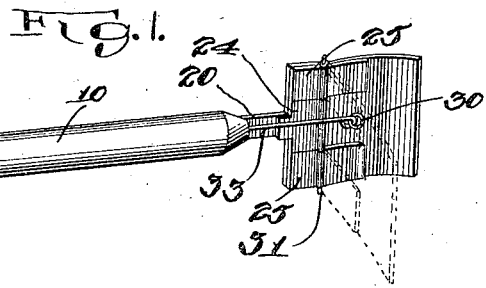
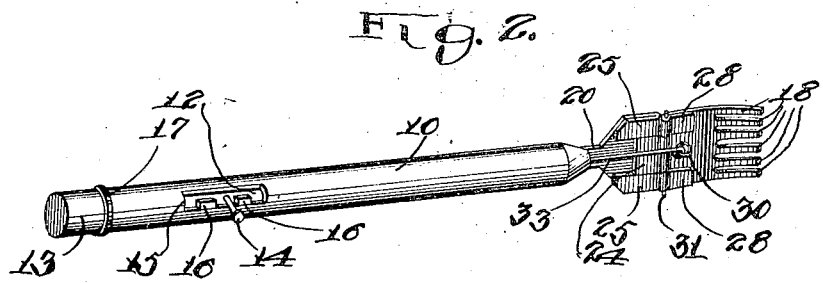
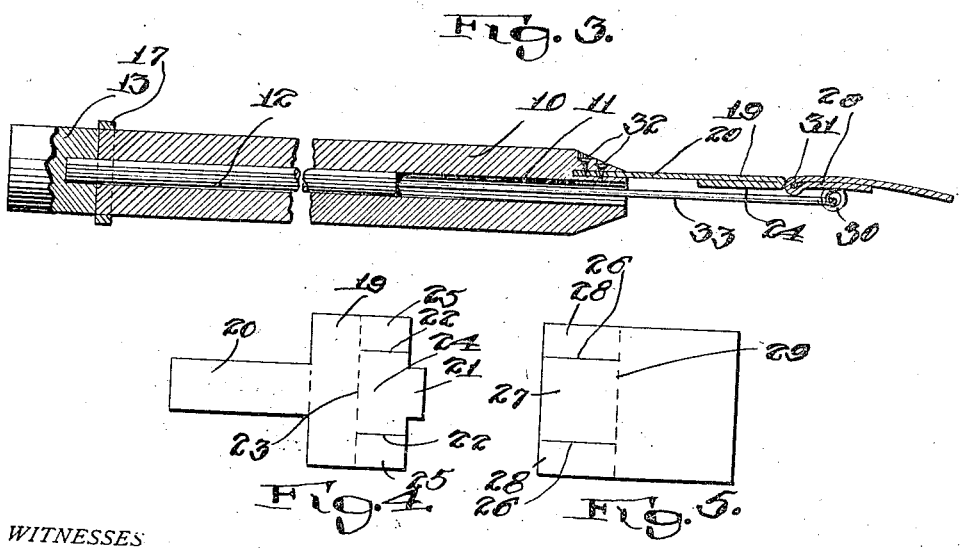
WITNESSES
INVENTOR
Thomas J. McIntosh
By E. E. Vrooman, his Attorney

UNITED STATES PATENT OFFICE.

THOMAS JAMES McINTOSH, OF SOUTH LYNCHBURG, SOUTH CAROLINA.

REVERSIBLE FORK AND RAKE.

1,076,048.

Specification of Letters Patent.   Patented Oct. 21, 1913.

Application filed November 23, 1912. Serial No. 733,199.

*To all whom it may concern:*

Be it known that I, THOMAS J. MCINTOSH, citizen of the United States, residing at South Lynchburg, in the county of Lee and State of South Carolina, have invented certain new and useful Improvements in a Reversible Fork and Rake, of which the following is a specification, reference being had therein to the accompanying drawing.
This invention relates to an improved type of garden implement, and the principal object of the invention is to provide a device which may be used either as a shovel or hoe, or as a fork and rake. It is of course understood that the only difference between the shovel and fork is that the blade in the fork is slotted to form the teeth.

Another object of the invention is to provide an improved means for operating the implement and also to provide an improved type of blade, the blade being so constructed that it will be very strong and durable.

With these and other objects in view this invention consists of certain novel combinations, constructions, and arrangements of parts as will be hereinafter fully described and claimed.

In the accompanying drawing:—Figure 1 is a perspective view of the shovel type of implement. Fig. 2 is a perspective view of the fork type of implement. Fig. 3 is a longitudinal sectional view through the shovel type of implement. Fig. 4 is a view of the blank from which the shank of the blade is formed. Fig. 5 is a view of the blank from which the blade is formed.

Referring to the accompanying drawing it will be seen that this invention comprises a handle 10 which is provided with a longitudinally extending opening 11 in which a shaft 12 is mounted. A head 13 is mounted upon the outer end of the shaft 12 so that the shaft may be rotated when desired. A pin 14 extends from the shaft 12 out through a slot 15. Lugs 16 extend partially across the slot 15 so that the pin 14 may be turned behind the lugs and thus the shaft 12 longitudinally adjusted. A band 17 is provided so that the handle will be prevented from splitting.

The blade and shank of the shovel or fork are made from blanks shown in Figs. 4 and 5, the only difference being that in the fork the blank shown in Fig. 5 would be provided with longitudinally extending slits, thus forming the teeth 18 at the end of the blade.

The shank is formed from the blank shown in Fig. 4 and from an inspection of this figure it will be seen that the blank comprises a body portion 19 from which there extends an arm 20 and a short lip 21 positioned in alinement with the arm 20. The body portion is provided with slits 22 and is intended to be bent along the dotted line 23 so that the central portion 24 will form a pivot ear and the side wings 25 will reinforce the side of the shank so that the shank will not be bent if the foot is placed upon the side portion of the shank in order to drive the shank in the ground.

The blade is formed from a rectangular blank shown in Fig. 5 and from an inspection of this figure it will be seen that the blank is provided with slits 26 so that the central portion 27 and the side wings 28 are formed. This blank is folded along the dotted line 29 so that the side wings 28 form pivot ears and the central portion 27 reinforces the shovel blade and thus the eye 30 which passes through the opening formed in the blade is prevented from tearing loose.

When assembling this device the blade and shank are pivotally connected by means of the pivot pin 31 passing through the hinge ears of the blade and shank, and the arm 20 is then inserted in a socket formed in the handle and secured in place by means of the securing screws 32. A rod 33 extends from the shaft 12 and has its outer end formed into an eye which is pivotally mounted in the eye 30.

When using this device the blade may be left in the extended position as shown in Figs. 1 and 2 and the implement may then be used either as a shovel or as a fork. If it is desired to use the implement as a hoe or rake the head 13 will be grasped and the shaft 12 turned so that the shaft may be drawn upwardly past the upper lug 16 and then turned to its former position. This pulling movement will move the blade to the position indicated in the dotted lines in Fig. 1, thus converting the implement into a hoe or rake.

Having thus described the invention what is claimed as new is:—

1. In a device of the character described, a handle, a shank carried by said handle, said shank being formed from a blank comprising a body portion provided with slits leading from one end to provide a central and side strips, the central strip being bent to form a hinge ear and the side strips bent back upon the body portion to reinforce the side portion thereof, a securing arm extending from said body portion and connected with said handle, a blade hinged to said hinge ear, and means carried by said handle and connected with said blade for moving said blade.

2. An implement of the character described comprising a handle, a shank carried by said handle and provided with a hinge ear at its outer end, a blade hinged to said hinge ear, said blade being formed from a blank provided with longitudinally extending slits forming a central and side strips, said strips being bent back upon said blank to form hinge ears at the sides of said blade, and a central reinforcing strip, an eye passing through the central portion of said blade, and means carried by said handle and pivotally connected with said eye for adjusting the angle of said blade.

In testimony whereof I hereunto affix my signature in presence of two witnesses.

THOMAS JAMES McINTOSH.

Witnesses:
W. F. BURKETT,
W. F. NESBITT.